US007189374B1

(12) United States Patent
Hawker

(10) Patent No.: US 7,189,374 B1
(45) Date of Patent: Mar. 13, 2007

(54) EMISSIONS CONTROL

(75) Inventor: Pelham Nigel Hawker, Royston (GB)

(73) Assignee: Johnson Matthey Public Limited Company, London (GB)

( * ) Notice: Subject to any disclaimer, the term of this patent is extended or adjusted under 35 U.S.C. 154(b) by 500 days.

(21) Appl. No.: 10/018,520

(22) PCT Filed: Jun. 7, 2000

(86) PCT No.: PCT/GB00/02202

§ 371 (c)(1),
(2), (4) Date: May 16, 2002

(87) PCT Pub. No.: WO00/77353

PCT Pub. Date: Dec. 21, 2000

(30) Foreign Application Priority Data

Jun. 15, 1999 (GB) ................................ 9913732.5

(51) Int. Cl.
*B01D 50/00* (2006.01)
*B01D 53/34* (2006.01)
*F01N 3/00* (2006.01)
*F02B 47/08* (2006.01)
*F02D 23/00* (2006.01)

(52) U.S. Cl. ...................... 422/168; 422/171; 422/177; 422/180; 60/274; 60/178; 60/280; 60/292; 60/605.2; 60/602; 123/568.12

(58) Field of Classification Search ................ 422/171, 422/172, 177, 180; 60/274, 278, 280, 292, 60/605.2, 602; 123/568.12
See application file for complete search history.

(56) References Cited

U.S. PATENT DOCUMENTS 4,231,338 A 11/1980 Sugasawa et al.
4,406,126 A 9/1983 Yokokura et al.
4,534,173 A 8/1985 Tsukamoto
4,902,487 A 2/1990 Cooper et al. ........... 423/215.5
5,050,376 A 9/1991 Stiglic et al.
5,440,880 A 8/1995 Ceynow et al.
5,564,283 A 10/1996 Yano et al.
5,785,030 A * 7/1998 Paas ............................ 60/278
5,806,308 A 9/1998 Khair et al.
6,062,026 A 5/2000 Woollenweber et al.
6,240,721 B1 6/2001 Ito et al.

(Continued)

FOREIGN PATENT DOCUMENTS

DE 40 07 516 9/1991

(Continued)

OTHER PUBLICATIONS

International Search Report dated Sep. 2000.

(Continued)

*Primary Examiner*—Alexa Neckel
*Assistant Examiner*—Kaity Handal
(74) *Attorney, Agent, or Firm*—RatnerPrestia

(57) ABSTRACT

A diesel engine (1) has an exhaust system (4) and an oxidation catalyst (5*a*). Exhaust gas for recirculation is taken through an intake pipe (6) downstream of the catalyst, and preferably upstream of a filter (5*b*) for soot. The recirculated gases are passed through a cooler (7) upstream of the EGR valve (8). Good removal of soot and $NO_x$ is achieved even at low exhaust gas temperature.

6 Claims, 1 Drawing Sheet

U.S. PATENT DOCUMENTS

| | | | |
|---|---|---|---|
| 6,301,888 B1 | 10/2001 | Gray, Jr. | |
| 6,338,245 B1 | 1/2002 | Shimoda et al. | |
| 6,427,436 B1 * | 8/2002 | Allansson et al. | 60/274 |

FOREIGN PATENT DOCUMENTS

| | | |
|---|---|---|
| DE | 198 53 119 | 5/1999 |
| JP | 6-66208 | 3/1994 |
| JP | 8-338320 | 12/1996 |
| JP | 9-88727 | 3/1997 |
| WO | WO 95/27128 | 10/1995 |
| WO | WO 99/09307 | 2/1999 |

OTHER PUBLICATIONS

British Search Report dated Sep. 24, 1999.

* cited by examiner

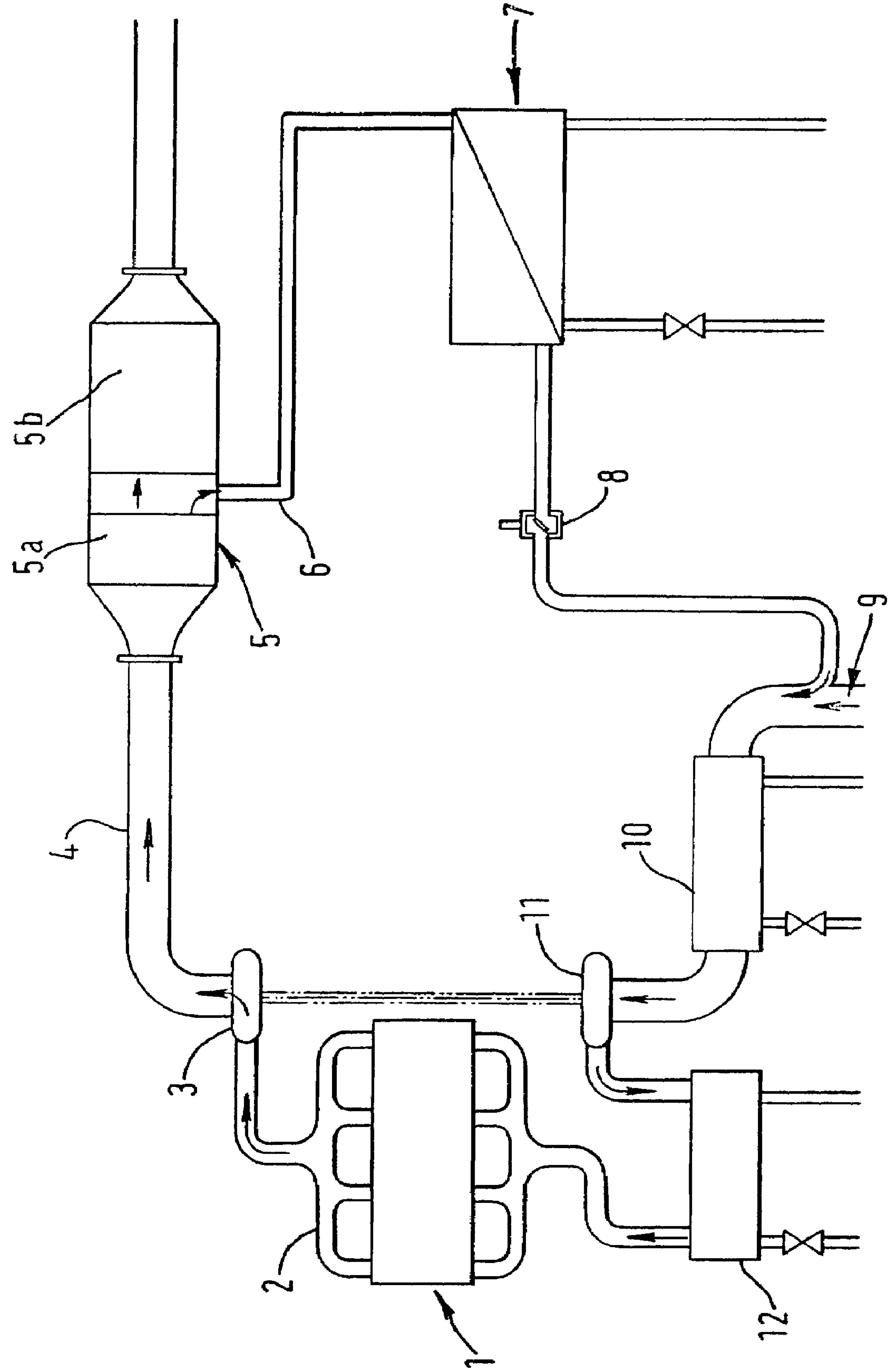
7
5b
5a
6
8
5
9
4
10
11
3
2
1
12

EMISSIONS CONTROL

This application is the U.S. national phase application of PCT International Application No. PCT/GB00/02202.

The present invention concerns improvements in emissions control. More especially, the invention concerns improvements in the control of particulates and NOx from diesel engines.

The use of emission control catalysts for engine exhaust clean-up is well established. Diesel engines have different characteristics from gasoline-fuelled engines, with a different mix of pollutants caused by the different fuels, the different combustion characteristics in each engine and the lower temperatures met with in exhausts from diesel engines. Additionally, diesel engines emit more noticeable particulates, especially under heavy load and upon start-up, than gasoline engines. In general, it can be said that diesel engines emit less NOx than a gasoline engine under most conditions, but because diesel engines mostly or exclusively operate on a high air to fuel ratio, that is are "lean"-burn engines, the chemistry of the exhaust gas does not favour NOx reduction by aftertreatement, because of the excess of oxidising species. There are engine design options available, which can reduce the quantities of $NO_x$ or of particulates but not both simultaneously.

To meet the various emission regulations already or about to enter force, it has become necessary to treat diesel exhausts in various ways. Oxidation catalysts, which catalyse the oxidation of unburnt hydrocarbons ("HCs") and carbon monoxide ("CO") are now regularly fitted to light duty diesels, and particulate traps of various types are becoming commonplace on heavy duty diesels as used in trucks, buses and some stationary engines. A technique for reducing gas emissions, especially NOx emissions from diesel engines is exhaust gas recirculation ("EGR"), which takes a proportion of the exhaust gas and recirculates it into the engine cylinders. Generally, about 30 up to 75 vol % of the exhaust gases are recirculated, depending upon the characteristics of the particular engine and the emission limits which must be met. Although EGR has been used with gasoline engines for many years, principally to improve fuel economy, it has only been more recently fitted to diesel engines; we believe that most diesel vehicles currently fitted with EGR are passenger car light duty diesel engines. In the case of engines fitted with a catalyst, the exhaust gas is believed to be always taken from upstream of the catalyst in practical applications. A system incorporating EGR and catalysts, believed to be applied to gasoline engines, is described in DE 19853119, where EGR gas flow is taken downstream of a close-coupled starter catalyst, but upstream of the main three way catalyst. It is generally expected that EGR would have a significant beneficial effect on emissions from heavy duty diesel engines, that is those fitted to heavy trucks and buses. Because of the engineering problems caused by the very different exhaust characteristics compared to light duty diesel engines, however, this has proved difficult to achieve. In particular, there is currently no commercial source of an EGR valve of suitable size and materials to be fitted to a heavy duty diesel engine.

We refer also to a device marketed as the "CRT™" by Johnson Matthey PLC. This device is described in U.S. Pat. No. 4,902,487 and is a continuously regenerative particulate trap. Unlike the vast majority of particulate traps, however, this device regenerates continuously or semi-continuously in situ without the need for periodic replacement or electrical heating to ignite the soot. Such device relies upon a catalyst system which generates $NO_2$ which has proved to be effective to cause low temperature combustion of trapped soot particles.

The principle of the CRT has been adopted by Hino in their published Japanese patent applications JP 8338320 and JP 9088727, in combination with EGR. However, such systems as described are not believed to be capable of use in true heavy duty diesel applications.

JP6066208 describes a diesel engine with EGR as well as an oxidation catalyst and a soot trap (or filter). However, it is clear that the EGR gas flow is taken from the engine without passing through any catalyst or any filter. The recycled gas is first filtered, then passed through an oxidation catalyst. We believe that the benefits from such a system do not match those from our own developments.

We have recently disclosed in WO 99/09307 a novel combination which can offer very low levels of NOx. That invention provides a diesel engine system comprising a diesel engine and an exhaust system therefor, characterised in that the exhaust system incorporates a catalyst effective to convert NO to $NO_2$ under normal operating conditions, a trap for particulates mounted downstream of the catalyst and an exhaust gas recirculation system mounted downstream of the trap, and provided with cooling means to cool the portion of exhaust gas which is recirculated.

DE-A-4007516 describes a diesel engine including an exhaust system having an oxidation catalyst and a particulate trap located downstream thereof.

It is noted that the gases for exhaust gas recirculation in WO 99/09307 and DE-A-4007516 are taken downstream of the trap, thus benefitting from reduced particulate.

The present invention provides a modified diesel EGR and catalyst system, comprising a diesel engine provided with an exhaust system, which exhaust system comprises an oxidation catalyst and an exhaust gas recirculation system, characterised in that the exhaust gas recirculation system intake is mounted downstream of the oxidation catalyst, and upstream of a trap for particulates, such that the portion of exhaust gases recirculated has passed through the oxidation catalyst.

Preferably, the oxidation catalyst is effective to oxidise at least a portion of NO in the exhaust gases to $NO_2$, under typical conditions for said engine. More preferably, the catalyst is a high loading platinum catalyst carried on a metal or ceramic flow-through honeycomb catalyst support. Such a support may have from 50 to 800 cells/sq.in, preferably about 400 cpsi. The catalyst may have a loading from 10 to 150 gm Pt/cu ft of catalyst, preferably 75 to 100 g/cu ft, optionally in association with one or more other platinum group metals and/or one or more base metal catalysts or promoters, such as Ce, V, W or Zr.

The present invention also provides a process for the reduction of polluting emissions from diesel engine exhaust gas including $NO_x$, comprising passing the engine-out exhaust gas through an oxidation catalyst to generate $NO_2$ from NO in the gas, taking a portion of the resulting gas from the resulting gas stream and recycling said portion to the engine intake and trapping particulates in a filter mounted downstream of the point of taking the resulting gas and oxidising the particulates by reaction with at least some of the $NO_2$ generated by the oxidation catalyst. Preferably, at least the majority of carbonaceous particles in the remaining gases are collected on a trap and continuously or semi-continuously oxidised by reaction with the $NO_2$.

The exhaust gas recirculation may be carried out using essentially well established technology, using valves in the exhaust system and a control system. It is believed that the present invention may be operated most effectively at a lower recirculation ratio (eg 5 to 30% by vol preferably 12 to 20% by vol) than is normal. Although engine intake vacuum may provide adequate EGR, it may be preferable to use pumping to provide a vacuum using a variable speed fan or pump operating under the control of the engine management unit.

Preferably, the EGR valve is mounted downstream, in the recirculation loop, of the cooler, whereby a proportion of the particulate is removed from the gases in the cooler. Since the recirculated gases are enriched with $NO_2$, it is possible, depending upon gas temperatures, flow rates and resistence times, for a proportion of particulates to be wholly or partially combusted within the cooler or "during flight".

It is to be realised that since only a portion of the exhaust gases is recycled, the system and process of the invention desirably include a particulate trap downstream of the EGR loop, such that all the gases fed to the exhaust outlet pipe are filtered. A preferred trap is an extruded ceramic, e.g. cordierite, wall flow filter. Other filters including metal mesh or metal or ceramic foams, may also be considered. Filters as such are not essential, if the system provides sufficient residence time for particulate to be oxidised by reaction with $NO_2$ in flight, possibly adhering to the front face or within the cells of catalytic components or variants on these.

FIG. 1 illustrates an emissions control system according to an exemplary embodiment of the present invention.

The present invention is believed to offer, in its preferred embodiments, certain unexpected advantages. The invention, because it does not depend upon a NOx reduction catalyst reaching light-off temperature, is effective to reduce NOx at all engine operating temperatures. This has increasing importance as diesel engines are designed to give increasing efficiency and exhaust gas temperatures fall. Additionally, traditional EGR systems suffer from wear and other degradation both of the EGR valves which are used to extract the recirculating portion of the exhaust gases, and on engine or exhaust components themselves. Such degradation may lead to expensive rebuilds and engine downtime, and a system that offers the potential for savings in this area has considerable economic value.

The portion of recirculated exhaust gases is desirably cooled before being admixed with combustion air for the engine. The combustion air is desirably at super-atmospheric pressure resulting from turbo-charger or supercharger, and it is well known to cool such combustion air to increase its density before intake into the cylinders.

Cooling may be achieved separately or when the recirculated gases and fresh combustion air are combined. Desirably a forced air cooler is used, although a liquid (e.g. water-) cooler may be used.

In accordance with the principles of the present invention, the skilled person may adapt the invention to different diesel engines and in different ways achieve the benefits of the invention.

The present invention is illustrated with reference to the accompanying schematic drawing of one embodiment of the invention.

A heavy duty diesel engine is generally indicated by 1. The engine exhaust manifold, 2, connects to a turbine, 3, and feeds into an exhaust system, 4. A catalyst element, 5*a* and a filter element, 5*b*, are mounted in a housing, 5. There is a pipe, 6, connected between the catalyst and filter elements, which can extract a portion of exhaust gas, according to the status of the exhaust flow valve described below and is the EGR intake. The portion of exhaust gas is passed to an exhaust gas cooler, generally indicated by 7, which is effective to reduce the temperature of the exhaust gas to the range 80 to 150° C. The exhaust gas cooler may be a liquid-cooled device, as shown in the drawing, or air cooled. The cooled gas then passes through an exhaust gas flow valve, 8, which is actuated under the control of an engine management unit (not shown). According to the position of the valve, exhaust gas is extracted through pipe 6 for recirculation. The engine management unit utilises conventional sensing to determine suitable load conditions for EGR operation, for example at idle and up to about half load conditions, including acceleration, but the use of EGR under full load conditions is not presently expected to be advantageous.

The exhaust gas is then blended with fresh air for combustion taken through an air intake, 9. Desirably an inter-cooler unit, 10, cools the combustion air and recycled exhaust gas to about 25 to 40° C. before it is compressed by a turbocharger unit, 11, driven by a shaft from the turbine, 3. The charge of gas is then passed through the standard inter-cooler unit, 12, to cool the gas to about 35 to 60° C. before it is fed to the engine.

The system of the invention, as described above, was fitted to a commercial 10 liter heavy duty engine, and tested over a variety of EGR rates. Using standardised tests, we found that engine-out NOx could be reduced by amounts from 20% to in excess of 80% in proportion to increasing the EGR rate from 5% by volume recirculated to approximately 30% recirculated. As is well known, however, a fuel consumption penalty applies to EGR, and the penalty for increasing NOx reduction beyond about 90% becomes commercially unacceptable. The preferred EGR rate according to the invention is from 15 to 25%.

The invention claimed is:

1. A diesel engine having an intake and comprising an exhaust system, which exhaust system comprises an oxidation catalyst; a particulate trap; and an exhaust gas recirculation (EGR) system comprising an EGR system intake for taking a portion of an exhaust gas stream and passing it to the engine intake, wherein the EGR system intake is located downstream of the oxidation catalyst and the particulate trap is located downstream of the EGR system intake.

2. An engine according to claim 1, wherein the exhaust system is configured for taking a remaining portion of the exhaust gas that does not pass to the engine intake through the particulate trap.

3. An engine according to claim 1, wherein the particulate trap is mounted in the EGR system.

4. An engine according to claim 1, wherein a recirculation ratio of the EGR system is varied from 5 to 30% by volume.

5. An engine according to claim 1 further comprising an EGR valve located downstream of the EGR system intake; and a cooler for cooling gases to be recirculated in the EGR system, the cooler being mounted between the EGR system intake and the EGR valve.

6. A process for the reduction of polluting emissions from diesel engine exhaust gas, which includes $NO_x$, comprising passing the engine exhaust gas over an oxidation catalyst to generate $NO_2$ from NO in the gas; recycling a portion of the gas that passed through the oxidation catalyst to an engine intake; and trapping particulates in a filter mounted downstream of where the portion of the exhaust gas is recycled; and oxidising the particulates trapped in the filter by reaction with at least some of the $NO_2$ generated in said passing step.

* * * * *